(12) United States Patent
Kitago et al.

(10) Patent No.: US 10,916,034 B2
(45) Date of Patent: Feb. 9, 2021

(54) HOST VEHICLE POSITION ESTIMATION DEVICE

(71) Applicants: TOYOTA JIDOSHA KABUSHIKI KAISHA, Toyota (JP); DENSO CORPORATION, Kariya (JP)

(72) Inventors: Masaki Kitago, Susono (JP); Kojiro Tateishi, Susono (JP)

(73) Assignees: TOYOTA JIDOSHA KABUSHIKI KAISHA, Toyota; DENSO CORPORATION, Kariya (JP)

(*) Notice: Subject to any disclaimer, the term of this patent is extended or adjusted under 35 U.S.C. 154(b) by 79 days.

(21) Appl. No.: 16/443,023

(22) Filed: Jun. 17, 2019

(65) Prior Publication Data

US 2020/0020126 A1 Jan. 16, 2020

(30) Foreign Application Priority Data

Jul. 10, 2018 (JP) ................................ 2018-130915

(51) Int. Cl.
*G06T 7/73* (2017.01)
*G01C 21/30* (2006.01)
(Continued)

(52) U.S. Cl.
CPC ................ *G06T 7/74* (2017.01); *G01C 21/30* (2013.01); *G06K 9/00818* (2013.01); *G06T 7/50* (2017.01); *G06T 2207/30252* (2013.01)

(58) Field of Classification Search
CPC ............ B60W 40/072; B60W 40/076; B60W 2552/30; G01B 11/00; G01B 11/24; G01B 11/026; G01B 11/255; G01C 11/04; G01C 21/005; G01C 21/28; G01C 21/30; G01C 21/3602; G01C 21/3647; G01C 21/3822; G01C 3/00; G01S 17/42; G02B 1/08;
(Continued)

(56) References Cited

U.S. PATENT DOCUMENTS

2009/0147106 A1* 6/2009 Sakamoto ............... H04N 5/217
348/234
2009/0169055 A1 7/2009 Ishikawa
(Continued)

FOREIGN PATENT DOCUMENTS

JP 2009156784 A 7/2009
JP 2012164254 A 8/2012

*Primary Examiner* — Kim Y Vu
*Assistant Examiner* — Francisco Albano Agra
(74) *Attorney, Agent, or Firm* — Sughrue Mion, PLLC

(57) ABSTRACT

A host vehicle position estimation device includes an object determination unit configured to determine whether or not a planar object is included in a captured image, on which a host vehicle travels, a center point information acquisition unit configured to, when the planar object is included in the captured image, acquire center point information of the planar object including at least one of longitudinal center coordinate and lateral center coordinate of the planar object in the captured image, a longitudinal distance calculation unit configured to calculate a longitudinal distance as a distance between the host vehicle and the planar object in a front-rear direction of the host vehicle, and a host vehicle position estimation unit configured to estimate a host vehicle position using the positional information of the planar object on the map and the longitudinal distance.

6 Claims, 9 Drawing Sheets

(51) Int. Cl.
*G06T 7/50* (2017.01)
*G06K 9/00* (2006.01)

(58) Field of Classification Search
CPC ... G02B 1/10; G02B 5/30; G06K 9/62; G06K 9/78; G06K 9/00818; G06K 9/00791; G06K 9/00798; G06K 9/00805; G06T 7/50; G06T 7/70; G06T 7/74; G06T 7/136; G06T 2207/20048; G06T 2207/20061; G06T 2207/30252; G06T 2207/30256; G08G 1/0969; G08G 1/09623; G08G 1/096716
See application file for complete search history.

(56) References Cited

U.S. PATENT DOCUMENTS

| | | | |
|---|---|---|---|
| 2018/0045516 A1* | 2/2018 | Sumizawa | G01C 21/005 |
| 2018/0059680 A1* | 3/2018 | Tateishi | G01S 19/42 |
| 2019/0113332 A1* | 4/2019 | Nishimura | G08G 1/09 |
| 2019/0346847 A1* | 11/2019 | Kamata | G01C 21/30 |

* cited by examiner

US 10,916,034 B2

HOST VEHICLE POSITION ESTIMATION DEVICE

TECHNICAL FIELD

The present disclosure relates to a host vehicle position estimation device.

CROSS-REFERENCE TO RELATED APPLICATION

This application claims the benefit of priority from Japanese Patent Application No. 2018-130915, filed Jul. 10, 2018, the entire contents of which are incorporated herein by reference.

BACKGROUND

In the related art, a technique that recognizes an object, such as a road sign, with a camera of a vehicle and estimates a host vehicle position using stored positional information of the object on a map is known. An example of the related art relating to object recognition is Japanese Unexamined Patent Publication No. 2012-164254 or the like. This publication discloses an object recognition device that recognizes a road sign (object) though making a distinction between a fixed sign and a temporary sign based on a position included in map information where the road sign is provided, thereby improving the recognition accuracy of the road sign.

SUMMARY

In the host vehicle position estimation using the object, there is a need to estimate the distance between a host vehicle and the object with high accuracy. In the object recognition device of the related art described above, although the position of the road sign is recognized through image processing, there is a room for improvement in recognition accuracy of an object, such as a road sign.

Accordingly, in the present technique field, it is desirable to provide a host vehicle position estimation device capable of estimating a host vehicle position with high accuracy by achieving improvement of estimation accuracy of the distance between an object included in a captured image and a host vehicle.

An aspect of the present disclosure provides a host vehicle position estimation device that estimates a host vehicle position as a position of a host vehicle on a map using an object included in a captured image in front of the host vehicle captured with a camera of the host vehicle. The host vehicle position estimation device includes a measurement position acquisition unit configured to acquire a measurement position of the host vehicle on the map based on a measurement result of a position measurement device mounted in the host vehicle, an object database configured to store object information including positional information of the object on the map and appearance information of the object, an object determination unit configured to determine whether or not a planar object as a kind of the object is included in the captured image based on the captured image and the object information, a traveling road information acquisition unit configured to acquire traveling road information relating to a traveling road, on which the host vehicle travels, a center point information acquisition unit configured to, when the object determination unit determines that the planar object is included in the captured image, acquire center point information of the planar object including at least one of longitudinal center coordinate and lateral center coordinate of the planar object in the captured image based on the captured image of the camera and the object information, a longitudinal distance calculation unit configured to calculate a longitudinal distance as a distance between the host vehicle and the planar object in a front-rear direction of the host vehicle based on the measurement position of the host vehicle on the map, positional information of the planar object on the map, the center point information of the planar object, and the traveling road information, an error amount estimation unit configured to estimate an error amount of the longitudinal distance based on the traveling road information, and a host vehicle position estimation unit configured to, when the error amount is less than an error threshold, estimate the host vehicle position using the positional information of the planar object on the map and the longitudinal distance.

In the host vehicle position estimation device according to the aspect of the present disclosure, when the planar object, such as a road sign, is included in the captured image, the longitudinal distance between the host vehicle and the planar object is calculated based on the measurement position of the host vehicle on the map, the positional information of the planar object on the map, the center point information of the planar object in the captured image, and the traveling road information. In the host vehicle position estimation device, since the error amount included in the longitudinal distance changes depending on the traveling road of the host vehicle, when the error amount of the longitudinal distance estimated from the traveling road information is less than the error threshold, the estimation of the host vehicle position is performed using the longitudinal distance. Therefore, according to the host vehicle position estimation device, since the longitudinal distance between the planar object included in the captured image and the host vehicle is estimated using the positional information of the planar object on the map, it is possible to achieve improvement of the estimation accuracy of the longitudinal distance compared to when the longitudinal distance is estimated solely from the captured image, and to estimate the host vehicle position with high accuracy.

In the host vehicle position estimation device according to the aspect of the present disclosure, the longitudinal distance calculation unit may be configured to, when the lateral center coordinate of the planar object is included in the center point information, calculate the longitudinal distance between the host vehicle and the planar object based on the measurement position of the host vehicle on the map, the positional information of the planar object on the map, the lateral center coordinate of the planar object in the captured image, and curvature radius information included in the traveling road information.

In the host vehicle position estimation device, the error amount estimation unit may be configured to, when a curvature radius of the traveling road is equal to or greater than a curvature radius threshold, estimate the error amount as a smaller value than when the curvature radius of the traveling road is less than the curvature radius threshold.

In the host vehicle position estimation device, the error amount estimation unit may be configured to, when a lateral distance of the planar object with respect to the host vehicle calculated from the measurement position of the host vehicle on the map and the positional information of the planar object on the map is equal to or greater than a lateral threshold, estimate the error amount as a smaller value than when the lateral distance is less than the lateral threshold.

In the host vehicle position estimation device according to the aspect of the present disclosure, the longitudinal distance calculation unit may be configured to, when the longitudinal center coordinate of the planar object is included in the center point information, calculate the longitudinal distance between the host vehicle and the planar object based on height information of the planar object on the map included in the positional information of the planar object on the map, the longitudinal center coordinate of the planar object in the captured image, and gradient information included in the traveling road information.

As described above, according to the aspect of the present disclosure, it is possible to estimate the host vehicle position with high accuracy by achieving improvement of the estimation accuracy of the longitudinal distance between the planar object included in the captured image and the host vehicle.

DETAILED DESCRIPTION

Figure 1:
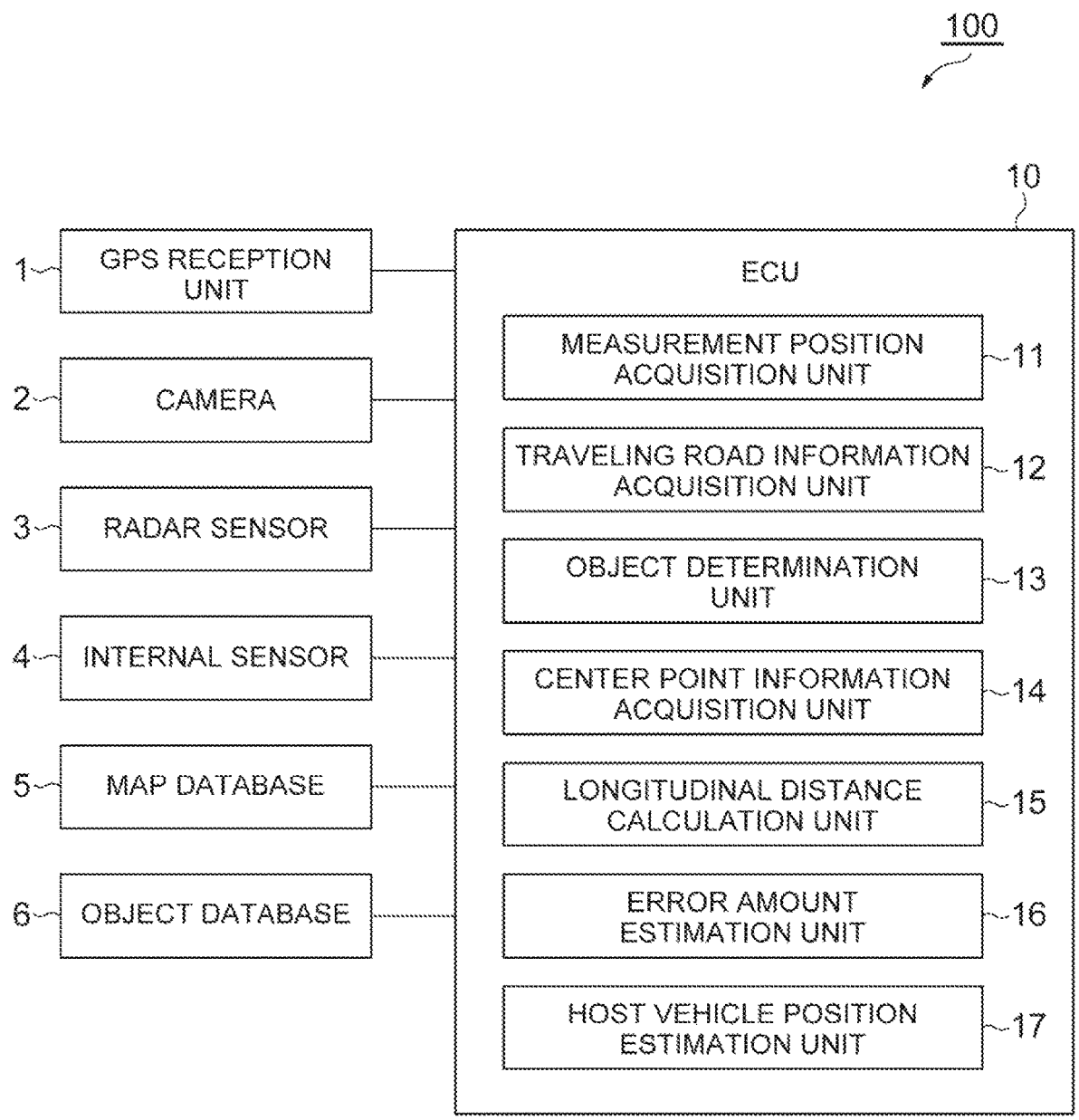
FIG. 1 is a block diagram showing a host vehicle position estimation device according to an embodiment.

Hereinafter, an embodiment of the present disclosure will be described referring to the drawings.

FIG. 1 is a block diagram showing a host vehicle position estimation device according to the embodiment. A host vehicle position estimation device 100 shown in FIG. 1 is a device that is mounted in a host vehicle, such as a passenger vehicle, and performs estimation of a host vehicle position as a position of the host vehicle on a map.

Configuration of Host Vehicle Position Estimation Device

As shown in FIG. 1, the host vehicle position estimation device 100 includes an electronic control unit (ECU) 10 that integrally manages a system. The ECU 10 is an electronic control unit having a central processing unit (CPU), a read only memory (ROM), a random access memory (RAM), and the like. In the ECU 10, for example, a program stored in the ROM is loaded on the RAM, and the program loaded on the RAM is executed on the CPU, thereby implementing various functions. The ECU 10 may be constituted of a plurality of electronic units.

The ECU 10 is connected to a GPS reception unit 1, a camera 2, a radar sensor 3, an internal sensor 4, a map database 5, and an object database 6.

The GPS reception unit 1 is a measurement unit configured to measure a position of the host vehicle (for example, the latitude and longitude of the host vehicle) on the map by receiving signals from three or more GPS satellites. The GPS reception unit 1 transmits measured positional information (measurement result) of the host vehicle to the ECU 10.

The camera 2 is imaging equipment that captures images of external circumstances of the host vehicle. The camera 2 is provided on a rear side of a windshield of the host vehicle, and captures an image in front of the host vehicle. The camera 2 transmits a captured image in front of the vehicle to the ECU 10. The camera 2 may be a monocular camera or a stereo camera. The camera 2 may be provided to capture an image on the side of the host vehicle. The captured image becomes an image where a longitudinal direction corresponds to a vertical direction (up-down direction) of the vehicle and a lateral direction corresponds to a vehicle width direction (right-left direction) of the vehicle. The longitudinal direction of the captured image may be in a correspondence relationship with the vertical direction and does not need to coincide with the vertical direction. The lateral direction of the captured image may be in a correspondence relationship with the vehicle width direction and does not need to coincide with the vehicle width direction.

The radar sensor 3 is detection equipment that detects an object around the host vehicle using an electric wave (for example, a millimeter wave) or light. Examples of the radar sensor 3 include a millimeter-wave radar or light detection and ranging (LIDAR). The radar sensor 3 transmits an electric wave or light around the host vehicle and receives an electric wave or light reflected from an object to detect the object. The radar sensor 3 transmits detection information of the object to the ECU 10. The radar sensor 3 may be constituted of a plurality of sensors including both of the millimeter-wave radar and the LIDAR. In the embodiment, the ECU 10 is not always connected to the radar sensor 3.

The internal sensor 4 is detection equipment that detects a traveling state of the host vehicle. The internal sensor 4 includes a vehicle speed sensor, an acceleration sensor, and a yaw rate sensor. The vehicle speed sensor is a detector that detects a speed of the host vehicle. As the vehicle speed sensor, for example, a wheel speed sensor that is provided in a wheel of the host vehicle, a drive shaft rotating integrally with the wheel, or the like and detects a rotation speed of the wheel is used. The vehicle speed sensor transmits detected vehicle speed information (wheel speed information) to the ECU 10.

The acceleration sensor is a detector that detects an acceleration of the host vehicle. The acceleration sensor includes, for example, a longitudinal acceleration sensor that detects a longitudinal acceleration of the host vehicle, and a lateral acceleration sensor that detects a lateral acceleration of the host vehicle. The acceleration sensor transmits, for example, acceleration information of the host vehicle to the ECU 10. The yaw rate sensor is a detector that detects a yaw rate (rotational angular velocity) of the center of gravity of the host vehicle around a vertical axis. As the yaw rate sensor, for example, a gyro sensor can be used. The yaw rate sensor transmits detected yaw rate information of the host vehicle to the ECU 10. The internal sensor 4 corresponds to an in-vehicle position measurement device when the internal sensor 4 is used for a measurement of a position of the vehicle on the map through odometry or the like.

The map database 5 is a database that stores map information. The map database 5 is formed, for example, inside a hard disk drive (HDD) mounted in the host vehicle. The map information includes positional information of roads (positional information of lanes), information (for example, curves, types of road straight segments, curvatures, and the like) of road shapes, positional information of intersections and junctions, and the like. The map database 5 may be formed in a server that is communicable with the host vehicle.

The object database 6 is a database that stores object information relating to objects. The object is an object whose positional information on the map is known and that is used as a criterion for host vehicle position estimation. The object information includes positional information of an object on the map and appearance information of the object. The positional information of the object on the map includes information of a coordinate position of the object on the map in plan view and height information of the object. The appearance information of the object is information relating to the appearance of the object for use in recognizing (specifying) of the object from the captured image of the camera 2 or the detection information of the radar sensor 3. The appearance information of the object may include the size of the object.

The object includes at least a planar object as a kind of object. The planar object is an object that is provided for a road and has a surface to be captured by the camera 2 from the host vehicle traveling on the road. The planar object includes a road sign, a signboard, a traffic signal, and the like. The planar object may be an object that has a display surface or the like provided to face the host vehicle traveling on the road. The height information of the planar object on the map includes information of the height of the center of a display surface of a road sign or the like. The object may include a lane of a road or the like in addition to the planar object.

The object database 6 may be a database integrated with the map database 5. The object database 6 may be formed in a server that is communicable with the host vehicle.

Next, the functional configuration of the ECU 10 will be described. The ECU 10 has a measurement position acquisition unit 11, a traveling road information acquisition unit 12, an object determination unit 13, a center point information acquisition unit 14, a longitudinal distance calculation unit 15, an error amount estimation unit 16, and a host vehicle position estimation unit 17. A part of the functions of the ECU 10 described below may be executed in a server that is communicable with the host vehicle.

The measurement position acquisition unit 11 acquires a measurement position as a position of the host vehicle on the map based on the positional information (measurement result) of the host vehicle measured by the GPS reception unit 1. The measurement position acquisition unit 11 acquires the measurement position, for example, as information of a latitude and a longitude. The measurement position acquisition unit 11 may acquire the measurement position of the host vehicle through odometry based on a previous measurement position and a detection result (vehicle speed information, yaw rate information, and the like) of the internal sensor 4.

The traveling road information acquisition unit 12 acquires traveling road information relating to a traveling road, on which the host vehicle travels. The traveling road information includes curvature radius information (or curvature information) of the traveling road and gradient information of the traveling road.

The traveling road information acquisition unit 12 acquires the traveling road information, for example, based on the measurement position of the host vehicle on the map acquired by the measurement position acquisition unit 11 and the map information of the map database 5. The traveling road information acquisition unit 12 may acquire the curvature radius information of the traveling road from a curvature radius of a lane of the traveling road based on the captured image of the camera 2 or the detection information of the radar sensor 3. The traveling road information acquisition unit 12 may acquire the gradient information of the traveling road from change in pitch of the vehicle based on the detection result of the internal sensor 4.

The object determination unit 13 determines whether or not a planar object is included in the captured image based on the captured image of the camera 2 and the object information of the object database 6. When the captured image is acquired from the camera 2, the object determination unit 13 executes image processing, such as edge detection and Hough transform, on the captured image. The object determination unit 13 executes, for example, object recognition processing, such as pattern matching using the object information (appearance information), thereby determining whether or not the planar object is included in the captured image.

The object determination unit 13 may narrow down candidates of planar objects in front of the host vehicle from among the objects included in the object information of the object database 6 using the measurement position of the host vehicle measured by the measurement position acquisition unit 11, and then, may execute object recognition processing, such as pattern matching. The object determination unit 13 may execute known object recognition processing based on the captured image captured by the camera 2 or the detection information of the radar sensor 3, and when a planar object is recognized, may determine whether or not the planar object is included in the captured image.

When the object determination unit 13 determines that the planar object is included in the captured image, the center point information acquisition unit 14 acquires center point information of the planar object including at least one of longitudinal center coordinate and lateral center coordinate of the planar object in the captured image based on the captured image of the camera 2 and the object information.

The longitudinal center coordinate of the planar object is a center coordinate of the planar object in a longitudinal direction of the captured image. The lateral center coordinate of the planar object is a center coordinate of the planar object in a lateral direction of the captured image. The center point information acquisition unit 14 performs, for example, edge detection on the captured image of the camera 2, and performs extraction of contour lines of the planar object through Hough transform according to the appearance information of the planar object. The center point information acquisition unit 14 acquires the center point information through image processing using the contour lines of the planar object in the captured image. The center point information acquisition unit 14 acquires the center point information of the planar object including at least one of the longitudinal center coordinate and the lateral center coordinate of the planar object in the captured image.

Figure 2A:
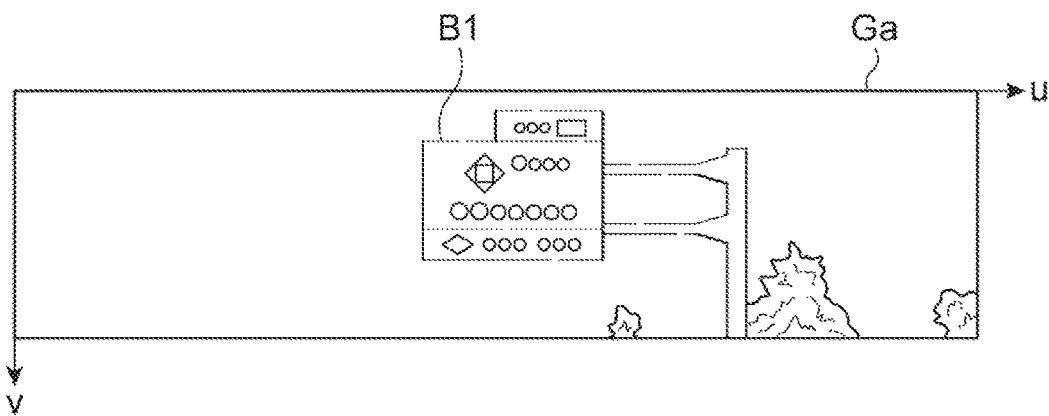
FIG. 2A is a diagram illustrating edge detection processing of a captured image.

Case where the Longitudinal Center Coordinate is Included in the Center Point Information Hereinafter, a case where the longitudinal center coordinate are included in the center point information will be described. FIG. 2A is a diagram illustrating edge detection processing of the captured image. In FIG. 2A, a planar object B1 and a search region Ga of the captured image for recognizing the planar object B1 are shown.

The planar object B1 shown in FIG. 2A is a road guide sign having a rectangular (square) appearance with an upper side and a lower side extending along a horizontal direction. The planar object B1 is a road guide sign that is attached to an arm projected over the road from a support column provided on a roadside and is provided over the road. The search region Ga is a region cut to search the planar object B1 in the captured image. The search region Ga can be set, for example, using a recognition result of the planar object B1 in the object determination unit 13. In addition, as a way of obtaining the search region Ga, a known method in image recognition can be employed.

In FIG. 2A, the longitudinal direction of the captured image of the camera 2 is shown as a v axis, and the lateral direction is shown as a u axis. The longitudinal direction v of the captured image corresponds to the vertical direction of the vehicle. The lateral direction u of the captured image corresponds to the vehicle width direction of the vehicle.

As shown in FIG. 2A, the center point information acquisition unit 14 performs edge detection on the search region Ga of the captured image of the camera 2, thereby detecting an edge included in the captured image from a difference in brightness or the like between pixels of the captured image. When the edge detection processing is already executed in the object determination unit 13, the center point information acquisition unit 14 may not execute overlapping edge detection processing.

Figure 2B:
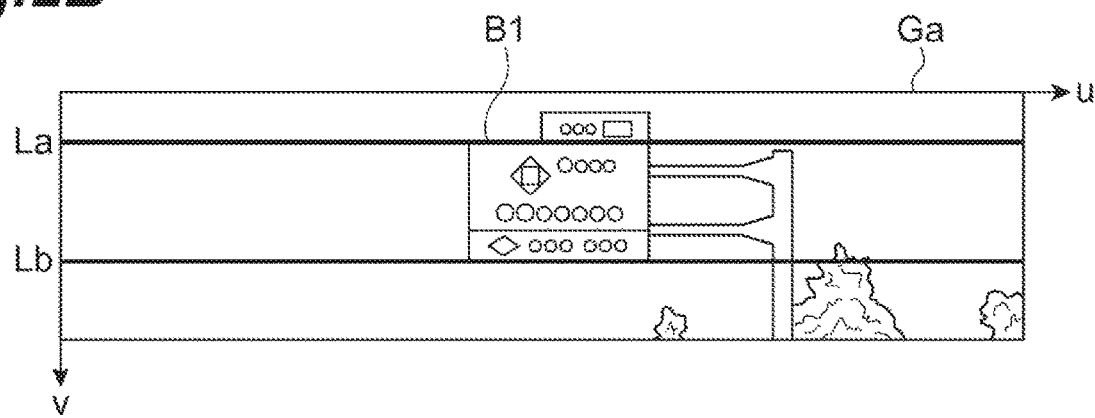
FIG. 2B is a diagram illustrating extraction of a pair of linear contour lines of the captured image through Hough transform.

FIG. 2B is a diagram illustrating extraction of a pair of linear contour lines of the captured image through Hough transform. In FIG. 2B, a linear contour line La including the upper side of the rectangular planar object B1 and a linear contour line Lb including the lower side of the rectangular planar object B1 are shown.

As shown in FIG. 2B, the center point information acquisition unit 14 performs Hough transform limited to the lateral direction u on the search region Ga of the captured image after edge detection since the appearance of the planar object B1 has a rectangular shape. With this, the center point information acquisition unit 14 extracts a pair of linear contour lines La, Lb corresponding to the upper side and the lower side of the rectangular planar object B1, respectively.

Figure 2C:
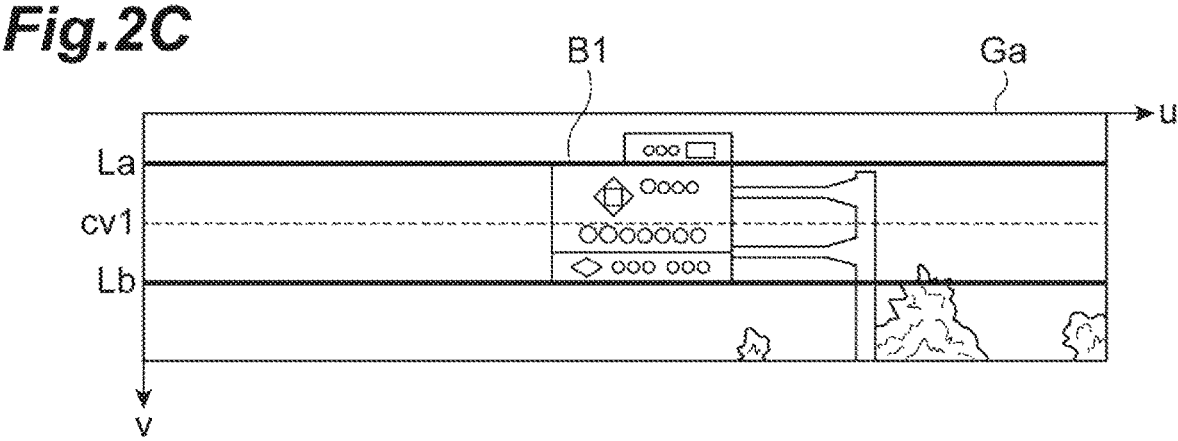
FIG. 2C is a diagram illustrating calculation of longitudinal center coordinate in the captured image.

FIG. 2C is a diagram illustrating calculation of the longitudinal center coordinate in the captured image. In FIG. 2C, a longitudinal center line cv1 corresponding to the longitudinal center coordinate of the planar object B1 is shown. The longitudinal center line cv1 is a line that extends in a lateral axis direction of the captured image and passes through the center coordinates of the planar object B1. The longitudinal center line cv1 is a line at the same distance from the two linear contour lines La, Lb on the captured image. That is, as an example, the center point information acquisition unit 14 calculates an ordinate at the same distance from the two linear contour lines La, Lb on the captured image as the longitudinal center coordinate of the planar object B1. In this way, the center point information acquisition unit 14 can acquire the center point information of the planar object B1 including the longitudinal center coordinate.

The center point information acquisition unit 14 does not always set the ordinate at the same distance from the two linear contour lines La, Lb as the longitudinal center coordinate, and may calculate an appropriate ordinate between the linear contour lines La, Lb as the longitudinal center coordinate based on the appearance information of the planar object B1.

When the center point information including the longitudinal center coordinate is acquired by the center point information acquisition unit 14, the longitudinal distance calculation unit 15 calculates a longitudinal distance between the host vehicle and the planar object based on the measurement position of the host vehicle on the map, the height information included in the positional information of the planar object on the map, the longitudinal center coordinate of the planar object in the captured image, the gradient information included in the traveling road information, and a focal length of the camera 2.

Specifically, the longitudinal distance calculation unit 15 can calculate the longitudinal distance using Expression (1) described below. In Expression (1) described below, zc1 is a longitudinal distance (a longitudinal distance calculated from the longitudinal center coordinate) between the camera 2 and the planar object, f is the focal length of the camera 2, yc1 is the height of the planar object with respect to the camera 2, Δv and a distance between the longitudinal center coordinate of the planar object in the captured image and a camera optical axis ordinate of the captured image. The focal length f of the camera 2 is a value determined in advance.

$$zc1 = f \frac{yc1}{\Delta v} \quad (1)$$

Figure 3A:
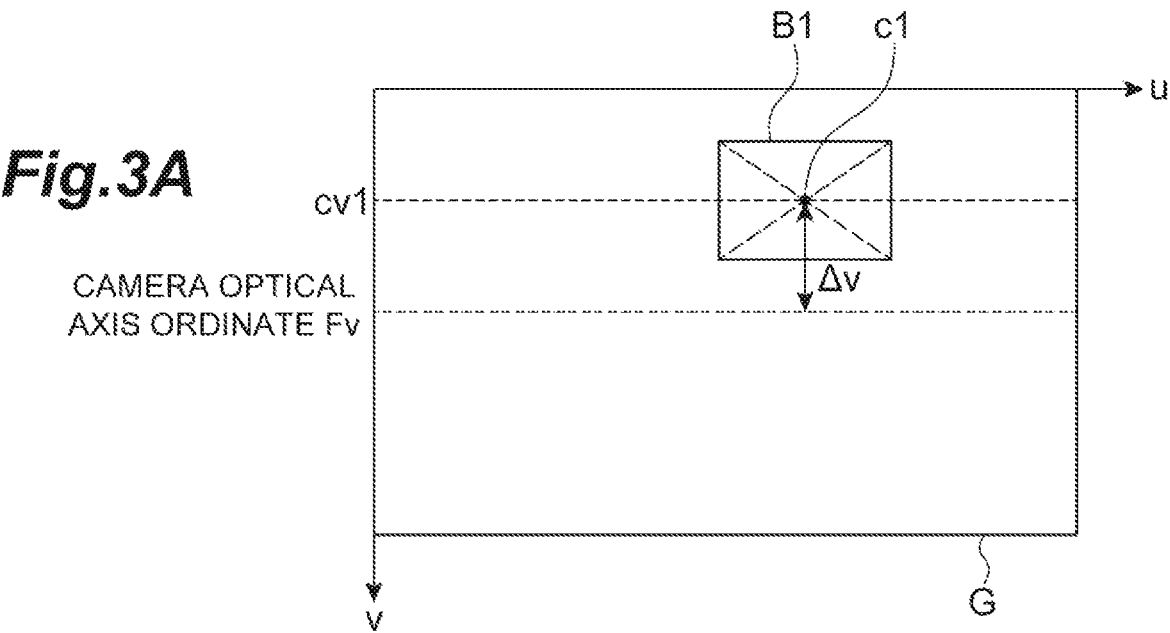
FIG. 3A is a diagram showing a distance Δv between a center position of the planar object in the captured image and a camera optical axis ordinate.

FIG. 3A is a diagram illustrating the distance Δv between a center position of the planar object and the camera optical axis ordinate in the captured image. In FIG. 3A, a captured image G (the entire captured image), a camera optical axis ordinate Fv of the captured image G, a center position c1 of the planar object B1, and the distance Δv between the center position c1 of the planar object B1 and the camera optical axis ordinate Fv are shown. The camera optical axis ordinate Fv corresponds to an ordinate of the optical axis of the camera 2 in the captured image G The camera optical axis ordinate Fv in the captured image G is a known coordinate. The camera optical axis ordinate Fv is decided from the setting of the camera 2, or the like.

The longitudinal distance calculation unit 15 calculates the distance Δv between the center position c of the planar object B1 in the longitudinal direction v of the captured image G and the camera optical axis ordinate Fv from the longitudinal center coordinate (corresponding to the longitudinal center line cv1) included in the center point information of the planar object B1 and the known camera optical axis ordinate Fv in the captured image G.

The longitudinal distance calculation unit 15 calculates the height yc1 of the planar object B1 with respect to the camera 2 from the height of the camera 2 as a known value stored in advance, the height information of the planar object B1 included in the positional information of the planar object B1 on the map, and the gradient information included in the traveling road information. The height yc1 of the planar object B1 with respect to the camera 2 is the height (a difference in the vertical direction) of the planar object B1 based on the camera 2.

When the height information of the planar object B1 included in the positional information of the planar object B1 on the map is information of a height from a road surface, in regard to the height yc1 of the planar object B1 with respect to the camera 2, the difference between a height of a road surface at the position of the host vehicle and a height of a road surface of the position of the planar object B1 needs to be taken into consideration. The longitudinal distance calculation unit 15 uses the gradient information included in the traveling road information, thereby calculating the height yc1 of the planar object B1 with respect to the camera 2 taking the difference in height of the road surface into consideration. When the height information of the planar object B1 included in the positional information of the planar object B1 on the map is a height, such as an altitude or a height above sea level, instead of the height based on the road surface, the longitudinal distance calculation unit 15 does not need to use the gradient information.

Figure 3B:
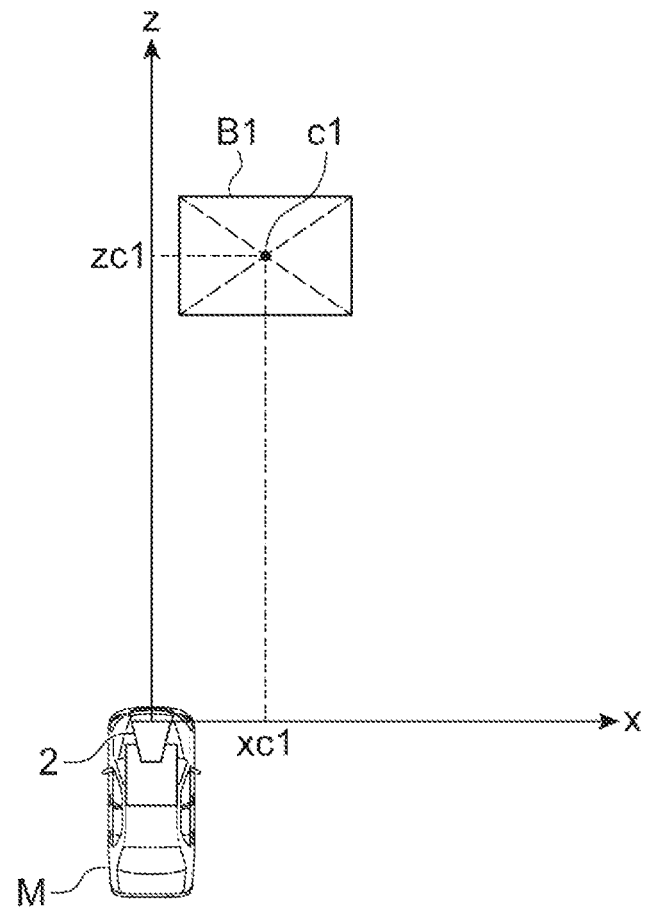
FIG. 3B is a plan view illustrating a positional relationship between a host vehicle and the center position of the planar object.

FIG. 3B is a plan view illustrating the positional relationship between a host vehicle M and the center position of the planar object B1. FIG. 3B is a plan view, and for ease of understanding, is represented by a diagram when the planar object B1 is viewed from the front. In FIG. 3B, the host vehicle is shown as M, a front-rear direction of the host vehicle M is shown as the z axis, and a vehicle width direction of the host vehicle is shown as the x axis. An origin of the z axis and the x axis in FIG. 3B is the camera 2 (for example, a lens surface of the camera 2). A longitudinal distance zc1 between the host vehicle M and a center position c1 of the planar object B1, and a lateral distance xc1 between the host vehicle M and a center position c1 of the planar object B1 are also shown. Here, the lateral distance xc1 is not used in calculation.

The longitudinal distance calculation unit 15 puts the distance Δv between the center position c1 of the planar object B1 and the camera optical axis ordinate Fv, the height yc1 of the planar object B1 with respect to the camera 2, and the known focal length f of the camera 2 in Expression (1) described above, thereby obtaining the longitudinal distance zc1 between the host vehicle M and the center position c1 of the planar object B. A calculation expression is not limited to Expression (1) described above, and any coefficient may be multiplied or any value may be added or subtracted.

In addition, the longitudinal distance calculation unit 15 may obtain a gradient change amount from the host vehicle M to the planar object B1 based on the gradient information of the traveling road and may obtain the height yc1 of the planar object B1 with respect to the camera 2 taking the gradient change amount into consideration.

When the longitudinal distance zc1 is calculated by the longitudinal distance calculation unit 15, the error amount estimation unit 16 performs estimation of an error amount Ez1 of the longitudinal distance zc1 based on the traveling road information. The error amount Ez1 of the longitudinal distance zc1 can include an error amount due to gradient change of the traveling road of the host vehicle M.

Figure 4:
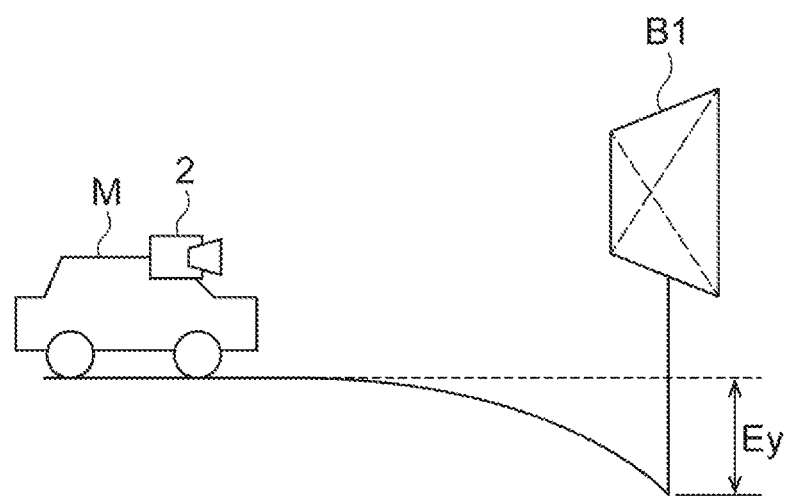
FIG. 4 is a diagram showing an example of an error amount Ey according to a gradient change amount.

The error amount due to gradient change of the traveling road of the host vehicle M is an error amount resulting from gradient change from the host vehicle M to the planar object B1. FIG. 4 is a diagram showing an example of an error amount Ey according to a gradient change amount. As shown in FIG. 4, when a gradient from the host vehicle M to the planar object B1 changes, the error amount Ey according to the gradient change amount occurs. Here, the error amount Ey is conceptually shown.

The error amount estimation unit 16 estimates the error amount Ez1 of the longitudinal distance zc1 taking into consideration the error amount Ey due to gradient change of the traveling road of the host vehicle M based on the gradient information of the traveling road information. For example, when the gradient change amount from the host vehicle M to the planar object B1 is equal to or greater than a gradient change amount threshold, the error amount estimation unit 16 estimates the error amount Ez1 as a greater value than when the gradient change amount is less than the gradient change amount threshold. The gradient change amount threshold is a value set in advance. The gradient change amount can be set to, for example, the difference between a gradient at the position of the host vehicle M and a gradient at the position of the planar object B1. As the gradient change amount, the difference between a height at the position of the host vehicle M and a height at the position of the planar object B1 may be taken.

Alternatively, when the gradient change amount from the host vehicle M to the planar object B1 is greater, the error amount Ez1 may be estimated as a greater value. The error amount estimation unit 16 may estimate the error amount Ez1 from the gradient change amount using table data, in which the gradient change amount and the error amount Ez1 are related to each other in advance.

The error amount estimation unit 16 can include an error of the longitudinal center coordinate of the planar object B1 on the captured image and an error of the camera optical axis ordinate Fv in the error amount Ez1 of the longitudinal distance zc1. The error of the longitudinal center coordinate of the planar object B1 on the captured image is an error accompanied by image processing (recognition processing of the planar object B on the captured image). The error of the camera optical axis ordinate Fv is an error on setting or calculation processing with respect to a true optical axis. The error of the longitudinal center coordinate of the planar object B1 on the captured image and the error of the camera optical axis ordinate Fv can be estimated at given amounts.

The error amount estimation unit 16 may estimate the error amount Ez1 of the longitudinal distance zc1 calculated from the longitudinal center coordinate using Expression (3) described below. Expression (3) can be derived from Expression (2) described below. In Expression (2), zc1 is substituted using Expression (1) described above.

$$Ez1 = |zc1 - z1_{true}| = \left| f \frac{yc1}{\Delta v} - z1_{true} \right| \quad (2)$$

$$Ez1 = \left| f \frac{(y1_{true} + Ey)}{(\Delta v_{true} - Ev)} - z1_{true} \right| \quad (3)$$

In Expression (3) described above, a true value of the height of the planar object B with respect to the camera 2 is $y_{true}$, a true value of the distance between the center position of the planar object B1 and the camera optical axis ordinate Fv on the captured image is $\Delta v_{true}$, and a true value of the longitudinal distance is $z1_{true}$. Since a true value $z_{true}$ of the longitudinal distance is not obtained strictly, the longitudinal distance zc1 is used as a substitute. For a true value $y1_{true}$ of the height of the planar object B1 with respect to the camera 2, the height yc1 of the planar object B1 with respect to the camera 2 calculated by the longitudinal distance calculation unit 15 is used as a substitute. For the true value $\Delta v_{true}$ of the distance between the center position of the planar object B1 and the camera optical axis ordinate Fv on the captured image, the distance $\Delta v$ calculated by the longitudinal distance calculation unit 15 is used as a substitute.

In Expression (3) described above, the error amount Ey due to the gradient change amount from the host vehicle M to the planar object B1 is shown, and a recognition error of the longitudinal center coordinate of the planar object B1 is shown as Ev. The error amount Ey due to the gradient change amount may be calculated from the gradient change amount or may be obtained using table data, in which the gradient change amount and the error amount Ey are related to each other in advance. The recognition error Ev of the longitudinal center coordinate of the planar object B1 can be set to a value determined in advance. The error amount estimation unit 16 may put these numerical values in Expression (3) described above, thereby estimating the error amount Ez1 of the longitudinal distance zc1 calculated from the longitudinal center coordinate.

Figure 5A:
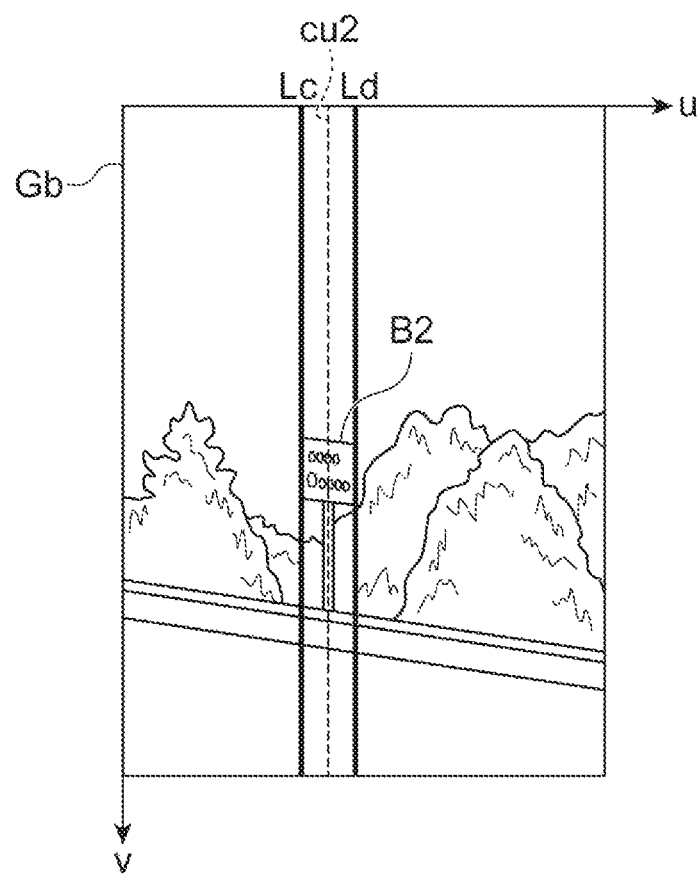
FIG. 5A is a diagram illustrating calculation of lateral center coordinate in the captured image.

Case where the Lateral Center Coordinate is Included in the Center Point Information Next, a case where the lateral center coordinate is included in the center point information will be described. FIG. 5A is a diagram illustrating calculation of the lateral center coordinate in the captured image. In FIG. 5A, a planar object B2, a search region Gb of a captured image of the camera 2, a linear contour line Lc including a left side of the rectangular planar object B2, a linear contour line Ld including a right side of the rectangular planar object B2, and a longitudinal center line cu2 corresponding to the lateral center coordinate of the planar object B2 are shown.

The planar object B2 shown in FIG. 5A is a road sign having a rectangular (square) appearance with a left side and a right side extending along the horizontal direction. The planar object B2 is supported by, for example, a support rod provided on a roadside. The search region Gb is a region cut to search the planar object B2 in the captured image.

Figure 5B:
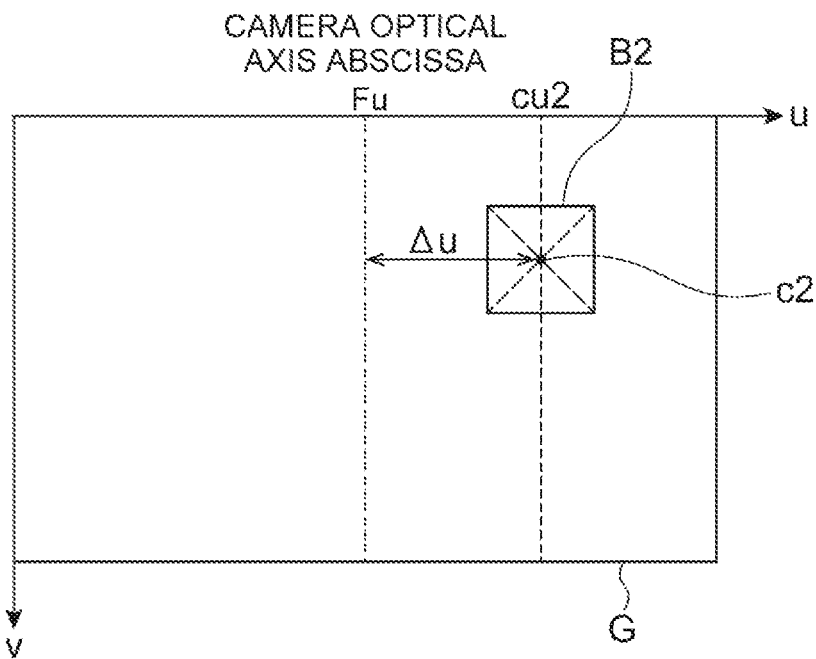
FIG. 5B is a diagram showing a distance Δu between the center position of the planar object in the captured image and a camera optical axis abscissa.

As shown in FIG. 5B, the center point information acquisition unit 14 obtains the lateral center coordinate in the same manner as the calculation of the longitudinal center coordinate. Specifically, the center point information acquisition unit 14 executes edge detection processing on the search region Gb of the captured image and performs Hough transform limited to the longitudinal direction v of the captured image captured image, thereby extracting a pair of linear contour lines Lc, Ld corresponding to the left side and the right side of the rectangular planar object B2. The longitudinal center line cu2 is a line at the same distance from the two linear contour lines Lc, Ld on the captured image. As an example, the center point information acquisition unit 14 calculates an abscissa at the same distance from the two linear contour lines Lc, Ld on the captured image as the lateral center coordinate of the planar object B2.

The center point information acquisition unit 14 does not always set the abscissa at the same distance from the two linear contour lines Lc, Ld as the lateral center coordinate, and may calculate an appropriate abscissa between the linear contour lines Lc, Ld as the lateral center coordinate based on the appearance information of the planar object B2.

Subsequently, the calculation of the longitudinal distance based on the lateral center coordinate of the planar object B2 will be described. When the center point information including the lateral center coordinate is acquired by the center point information acquisition unit 14, the longitudinal distance calculation unit 15 calculates the longitudinal distance between the host vehicle M and the planar object B2 based on the measurement position of the host vehicle on the map, positional information of the planar object B2 on the map, the lateral center coordinate of the planar object B2 in the captured image, the curvature radius information included in the traveling road information, and the focal length of the camera 2.

Specifically, the longitudinal distance calculation unit 15 can calculate the longitudinal distance using Expression (4) described below. In Expression (4) described below, zc2 is the longitudinal distance between the camera 2 and the planar object B2, f is the focal length of the camera 2, xc2 is the lateral distance between the host vehicle M and the planar object B2 on the map, and Au is the distance between the lateral center coordinate of the planar object B2 in the captured image and the camera optical axis abscissa of the captured image. The focal length f of the camera 2 is a value determined in advance.

$$zc2 = f \frac{xc2}{\Delta u} \quad (4)$$

FIG. 5B is a diagram illustrating the distance $\Delta u$ between the center position of the planar object B2 and the camera optical axis abscissa in the captured image. In FIG. 5B, the captured image G (entire captured image), a camera optical axis abscissa Fu of the captured image G, the center position c2 of the planar object B2, and the distance $\Delta u$ between the center position c2 of the planar object B2 and the camera optical axis abscissa Fu are shown. The camera optical axis abscissa Fu corresponds to the abscissa of the optical axis of the camera 2 in the captured image G. The camera optical axis abscissa Fu in the captured image G is known, and is determined from the setting of the camera 2, or the like.

The longitudinal distance calculation unit 15 calculates the distance $\Delta u$ between the center position c2 of the planar object B2 and camera optical axis abscissa Fu in the lateral direction u of the captured image G from the lateral center coordinate (corresponding to the longitudinal center line cu2) included in the center point information of the planar object B2 and the known camera optical axis abscissa Fu in the captured image G.

The longitudinal distance calculation unit 15 calculates the lateral distance xc2 between the host vehicle M and the planar object B2 on the map from the measurement position of the host vehicle on the map and the positional information of the planar object B2 on the map. The longitudinal distance calculation unit 15 recognizes the direction of the host vehicle M from temporal change of the measurement position of the host vehicle on the map to recognize the lateral direction. The longitudinal distance calculation unit 15 may recognize the direction of the host vehicle M from the yaw rate detected by the yaw rate sensor. The longitudinal distance calculation unit 15 calculates the lateral distance xc2 as the distance between the host vehicle M and the planar object B2 in the lateral direction of the host vehicle M.

The longitudinal distance calculation unit 15 puts the distance Δu between the center position c2 of the planar object B2 and the camera optical axis abscissa Fu, the lateral distance xc2 between the host vehicle M and the planar object B2 on the map, and the known focal length f of the camera 2 in Expression (4) described above, thereby obtaining the longitudinal distance zc2 between the host vehicle M and the center position c2 of the planar object B2. A calculation expression is not limited to Expression (4) described above, and any coefficient may be multiplied or any value may be added or subtracted.

When the longitudinal distance zc2 is calculated by the longitudinal distance calculation unit 15, the error amount estimation unit 16 performs estimation of an error amount Ez2 of the longitudinal distance zc2 based on the traveling road information. The error amount Ez2 of the longitudinal distance zc2 includes an error amount due to the curvature radius of the traveling road of the host vehicle M.

Figure 6A:
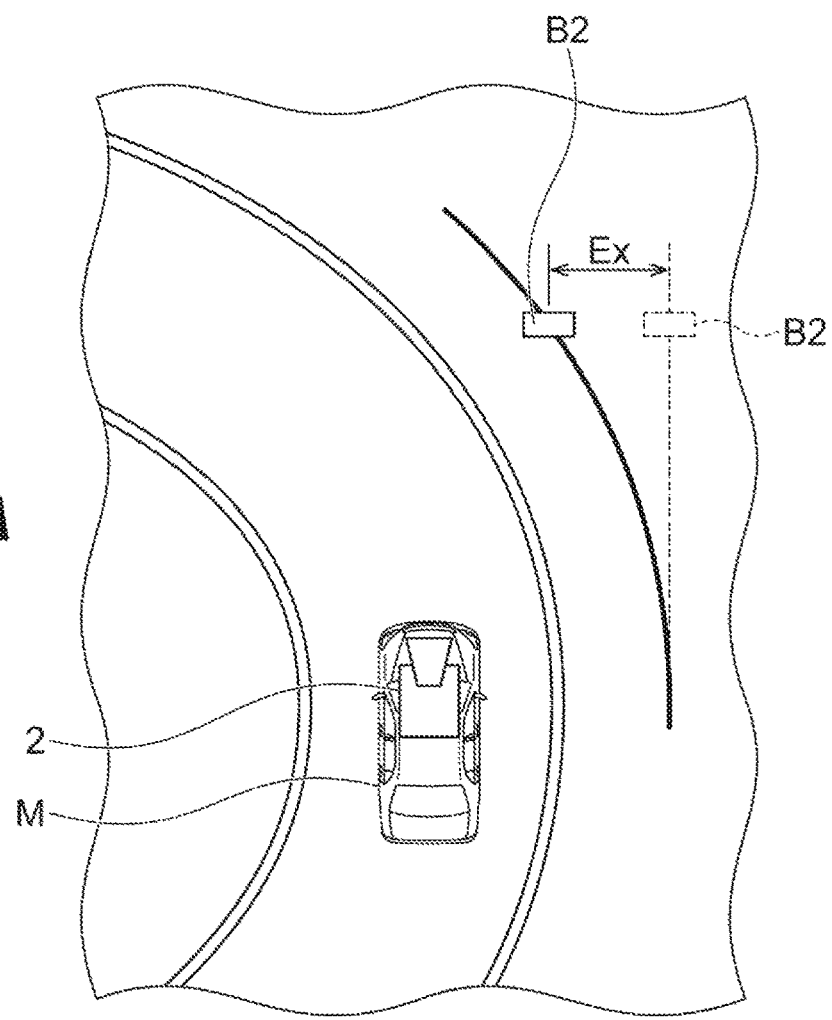
FIG. 6A is a plan view showing an example of an error amount Ex according to a curvature radius of a traveling road.

The error amount due to the curvature radius of the traveling road of the host vehicle M is an error amount resulting from the curvature radius of the traveling road, on which the host vehicle M travels. FIG. 6A is a diagram showing an example of an error amount Ex due to the curvature radius of the traveling road. As shown in FIG. 6A, when the host vehicle M is traveling on a curve with the curvature radius of the traveling road equal to or less than a given value, the error amount Ex of the position of the planar object B2 occurs in the vehicle width direction of the host vehicle M according to the curvature radius.

The error amount estimation unit 16 estimates the error amount Ez2 of the longitudinal distance zc2 based on the curvature radius information of the traveling road information taking of the error amount Ex due to the curvature radius of the traveling road into consideration. For example, when the curvature radius of the traveling road is equal to or greater than a curvature radius threshold, the error amount estimation unit 16 estimates the error amount Ez2 as a greater value than when the curvature radius of the traveling road is less than the curvature radius threshold. The curvature radius threshold is a value set in advance.

Alternatively, the error amount estimation unit 16 may estimate the error amount Ez2 as a greater value when the curvature radius of the traveling road is smaller. The error amount estimation unit 16 may estimate the error amount Ez2 from the curvature radius of the traveling road using table data, in which the curvature radius of the traveling road and the error amount Ez2 are related to each other in advance.

The error amount estimation unit 16 can include in the error amount of the longitudinal distance zc2, an error of the lateral center coordinate of the planar object B2 on the captured image and an error of the camera optical axis abscissa Fu. The error of the lateral center coordinate of the planar object B2 on the captured image and the error of the camera optical axis abscissa Fu are errors due to image processing or the like and can be estimated at given amounts.

The error amount estimation unit 16 may estimate the error amount Ez2 of the longitudinal distance zc2 calculated from the lateral center coordinate using Expression (6) described below. Expression (6) can be derived from Expression (5) described below. In Expression (5), the longitudinal distance zc2 is substituted using Expression (4) described above.

$$Ez2 = |zc2 - z2_{true}| = \left| f \frac{xc2}{\Delta u} - z2_{true} \right| \quad (5)$$

$$Ez2 = \left| f \frac{(x2_{true} + Ex)}{(\Delta u_{true} - Eu)} - z2_{true} \right| \quad (6)$$

In Expression (6) described above, a true value of the lateral distance of the planar object B2 with respect to the host vehicle M is $x2_{true}$, a true value of the distance between the center position of the planar object B2 and the camera optical axis abscissa Fu on the captured image is $\Delta u_{true}$, and a true value of the longitudinal distance is $z2_{true}$. Since the true value z2a of the longitudinal distance is not obtained strictly, the longitudinal distance zc2 is used as a substitute. For the true value $x2_{true}$ of the lateral distance of the planar object B2 with respect to the host vehicle M, the lateral distance xc2 of the planar object B2 with respect to the host vehicle M calculated by the longitudinal distance calculation unit 15 is used as a substitute. For the true value $\Delta u_{true}$ of the distance between the center position of the planar object B2 and the camera optical axis abscissa Fu on the captured image, the distance Δu calculated by the longitudinal distance calculation unit 15 is used as a substitute.

In Expression (6) described above, the error amount Ex due to the curvature radius of the traveling road of the host vehicle M is shown, and a recognition error of the lateral center coordinate of the planar object B2 is shown as Eu. The error amount Ex due to the curvature radius of the traveling road may be calculated from the curvature radius, or may be obtained using table data, in which the curvature radius and the error amount Ex are related to each other in advance.

Figure 6B:
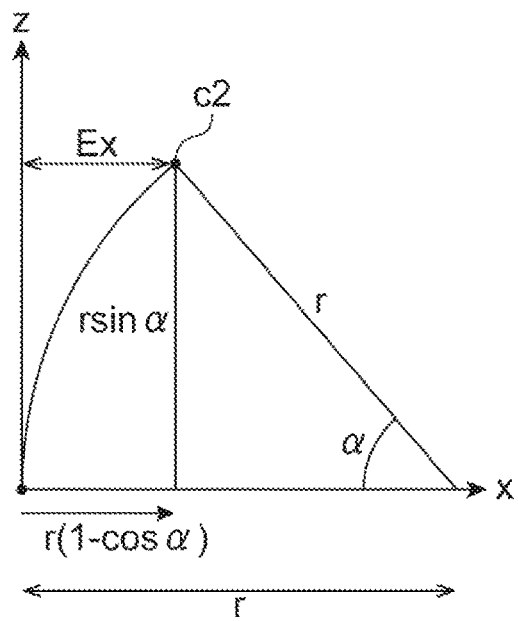
FIG. 6B is a diagram illustrating a relationship between a curvature radius of a traveling lane and the error amount Ex according to the curvature radius of the traveling road.

FIG. 6B is a diagram showing the relationship between a curvature radius of a traveling lane and the error amount Ex due to the curvature radius of the traveling road. In FIG. 6B, the position of the center position c2 of the planar object B2 when the traveling road is a straight road is represented as a starting point (origin) of the x axis. In FIG. 6B, a curvature radius r, an angle α of the center position c2 viewed from an arc center of the curvature radius r, and an error amount Ex are shown. As shown in FIG. 6B, the error amount Ex due to the curvature radius of the traveling road may be obtained as r(1−cos α). A recognition error Eu of the lateral center coordinate of the planar object B2 can be set to a value determined in advance. The error amount estimation unit 16 may put these numerical values in Expression (6) described above, thereby estimating the error amount Ez2 of the longitudinal distance zc2 calculated from the lateral center coordinate.

In addition, the error amount estimation unit 16 may estimate the error amount Ez2 of the longitudinal distance zc2 based on the lateral distance xc2 of the planar object B2 with respect to the host vehicle M. It has been found that the error amount Ez2 of the longitudinal distance zc2 becomes small according to the lateral distance xc2 of the planar object B2 with respect to the host vehicle M. For this reason, when the lateral distance xc2 of the planar object B2 with respect to the host vehicle M calculated from the measurement position of the host vehicle M on the map and the positional information of the planar object B2 on the map is equal to or greater than a lateral threshold, the error amount estimation unit 16 may estimate the error amount Ez2 as a smaller value than when the lateral distance xc2 is less than the lateral threshold. The lateral threshold is a value set in advance. The lateral threshold can be set to 5 m as an example.

Case where Both of the Longitudinal Center Coordinate and the Lateral Center Coordinate are Included in the Center Point Information The center point information acquisition unit 14 may acquire center point information including both of the longitudinal center coordinate and the lateral center coordinate of the planar object in the captured image. The center point information acquisition unit 14 may extract a linear contour line Lc including a left side and a linear contour line Ld including a right side in addition to the linear contour line La including the upper side and the linear contour line Lb including the lower side, for example, in the rectangular planar object B1 shown in FIG. 3A through Hough transform, thereby calculating both of the longitudinal center coordinate and the lateral center coordinate of the planar object B1.

In addition, when the appearance of the planar object included in the captured image has a rhombic shape, the center point information acquisition unit 14 may perform Hough transform to extract linear contour lines at 45° and 135° with respect to the captured image, thereby calculating the longitudinal center coordinate and the lateral center coordinate. When the planar object included in the captured image has a circular shape, the center point information acquisition unit 14 may perform image recognition of a contour line of the circular planar object to calculate the longitudinal center coordinate and the lateral center coordinate as the center coordinates of the circular contour line. The center point information acquisition unit 14 can acquire the center point information including at least one of the longitudinal center coordinate and the lateral center coordinate of each of the planar objects having various shapes through known image processing.

When both of the longitudinal center coordinate and the lateral center coordinate are included in the center point information, the longitudinal distance calculation unit 15 may calculate the longitudinal distance $zc1$ obtained from the longitudinal center coordinate and the longitudinal distance $zc2$ obtained from the lateral center coordinate, respectively. An aspect may be made in which the longitudinal distance calculation unit 15 calculates solely one to be considered to have high accuracy between the longitudinal distance $zc1$ and the longitudinal distance $zc2$ based on the appearance information of the planar object.

When both of the longitudinal distance $zc1$ and the longitudinal distance $zc2$ are calculated, the error amount estimation unit 16 estimates the error amount $Ez1$ of the longitudinal distance $zc1$ and the error amount $Ez2$ of the longitudinal distance $zc2$, respectively. The error amount estimation unit 16 may compare the error amount $Ez1$ of the longitudinal distance $zc1$ with the error amount $Ez2$ of the longitudinal distance $zc2$, thereby determining the smaller error amount between the longitudinal distance $zc1$ and the longitudinal distance $zc2$.

Host Vehicle Position Estimation

When solely the longitudinal distance $zc1$ between the longitudinal distance $zc1$ and the longitudinal distance $zc2$ is calculated by the longitudinal distance calculation unit 15, and the error amount $Ez1$ is estimated by the error amount estimation unit 16, the host vehicle position estimation unit 17 determines whether or not the error amount $Ez1$ is less than an error threshold. The error threshold is a value set in advance.

When the error amount $Ez1$ is less than the error threshold, the host vehicle position estimation unit 17 performs estimation of the host vehicle position as the position of the host vehicle M on the map using the longitudinal distance $zc1$. The host vehicle position estimation unit 17 estimates the host vehicle position based on the longitudinal distance $zc1$, the measurement position of the host vehicle M on the map (or a previously estimated host vehicle position), and the position of the planar object on the map. When the error amount $Ez1$ is equal to or greater than the error threshold, the host vehicle position estimation unit 17 does not use the longitudinal distance $zc1$ for the estimation of the host vehicle position.

When solely the longitudinal distance $zc2$ between the longitudinal distance $zc1$ and the longitudinal distance $zc2$ is calculated by the longitudinal distance calculation unit 15, and the error amount $Ez2$ is estimated by the error amount estimation unit 16, the host vehicle position estimation unit 17 determines whether or not the error amount $Ez2$ is less than the error threshold.

When the error amount $Ez2$ is less than the error threshold, the host vehicle position estimation unit 17 performs estimation of the host vehicle position as the position of the host vehicle M on the map using the longitudinal distance $zc2$. The host vehicle position estimation unit 17 estimates the host vehicle position based on the longitudinal distance $zc2$, the measurement position of the host vehicle M on the map (or a previously estimated host vehicle position), and the position of the planar object on the map. When the error amount $Ez2$ is equal to or greater than the error threshold, the host vehicle position estimation unit 17 does not use the longitudinal distance $zc2$ for the estimation of the host vehicle position.

When both of the longitudinal distance $zc1$ and the longitudinal distance $zc2$ are calculated by the longitudinal distance calculation unit 15, and the error amount $Ez1$ and the error amount $Ez2$ are estimated by the error amount estimation unit 16, the host vehicle position estimation unit 17 determines whether or not the error amount $Ez1$ and the error amount $Ez2$ are less than the error threshold. When both of the error amount $Ez1$ and the error amount $Ez2$ are equal to or greater than the error threshold, the host vehicle position estimation unit 17 does not use both of the longitudinal distance $zc1$ and the longitudinal distance $zc2$ for the estimation of the host vehicle position.

When solely one of the error amount $Ez1$ and the error amount $Ez2$ is less than the error threshold, the host vehicle position estimation unit 17 estimates the host vehicle position using the longitudinal distance with the error amount less than the error threshold. When both of the error amount $Ez1$ and the error amount $Ez2$ are less than the error threshold, the host vehicle position estimation unit 17 performs comparison of the error amount $Ez1$ with the error amount $Ez2$. The host vehicle position estimation unit 17 estimates the host vehicle position using the longitudinal distance with the smaller error amount between the error amount $Ez1$ of the longitudinal distance $zc1f$ and the error amount $Ez2$ of the longitudinal distance $zc2$.

Figure 7A:
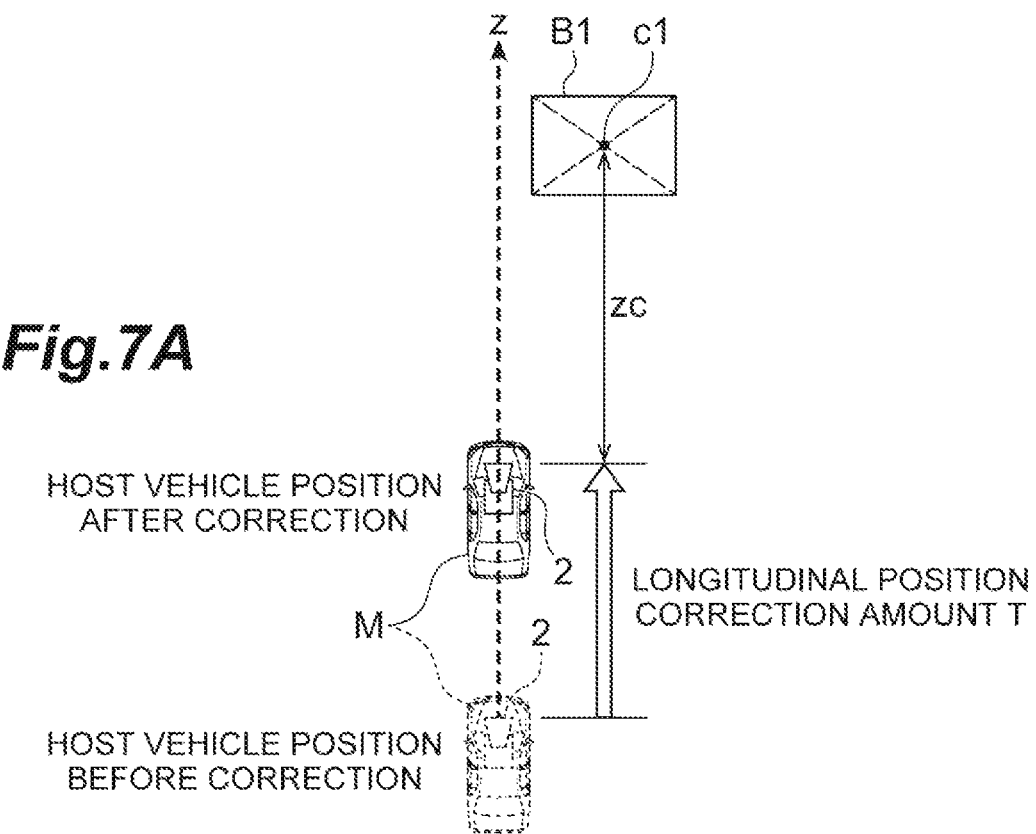
FIG. 7A is a plan view illustrating an example of correction of a host vehicle position using a longitudinal distance between the host vehicle and the planar object

An aspect may be made in which the host vehicle position estimation unit 17 performs correction of the host vehicle position using the longitudinal distance on the host vehicle position estimated using an object, such as a lane of the traveling road. FIG. 7A is a plan view illustrating an example of correction of the host vehicle position using the longitudinal distance $zc$ (the longitudinal distance with the smaller error amount between the longitudinal distance $zc1$ and the longitudinal distance $zc2$) between the host vehicle M and the planar object. In FIG. 7A, a longitudinal position correction amount T of the host vehicle M is shown. The longitudinal position correction amount T is equal to the distance between the host vehicle position before correction and the host vehicle position after correction in the longitudinal direction (the front-rear direction of the host vehicle M).

Figure 7B:
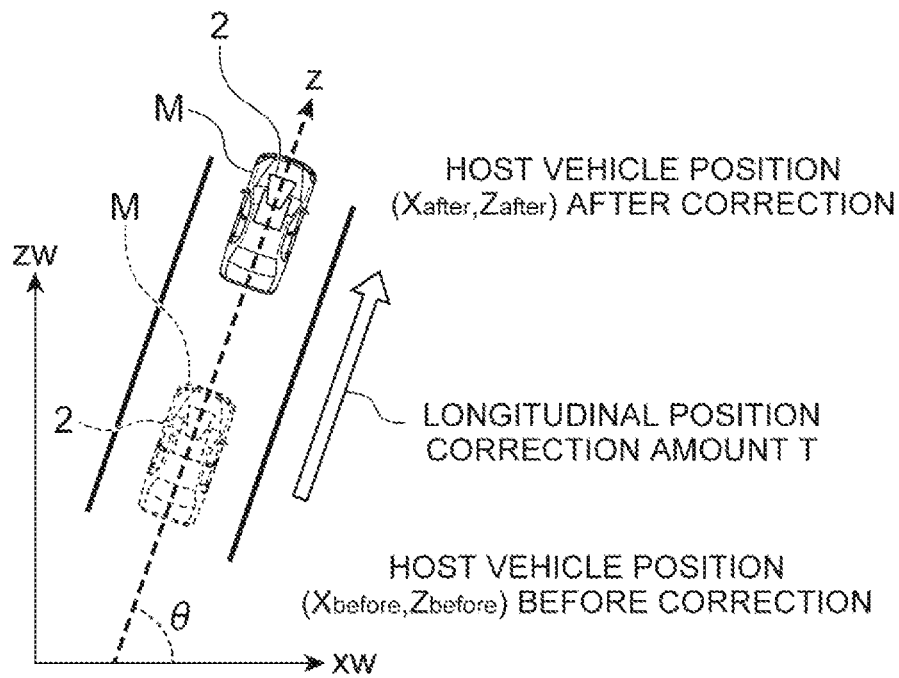
FIG. 7B is a plan view illustrating correction of the host vehicle position in any map coordinate system.

As shown in FIG. 7A, even though the host vehicle position before correction is mistaken in the longitudinal direction, the host vehicle position estimation unit 17 uses the longitudinal distance with respect to the planar object B2, thereby correcting the host vehicle position. FIG. 7B is a plan view illustrating an example of correction of the host vehicle position in any map coordinate system. FIG. 7B shows a map coordinate system in which zw is the vertical axis and xw is the horizontal axis. It is assumed that the angle between the horizontal axis xw and the longitudinal direction z of the host vehicle M is θ. In the map coordinate system, the host vehicle position before correction is shown as ($x_{before}, z_{before}$), and the host vehicle position after correction is shown as ($x_{after}, z_{after}$).

In this case, the host vehicle position after correction can be obtained from Expressions (7) and (8) described below using the longitudinal position correction amount T.

$$x_{differ} = x_{before} + (\text{Longitudinal Position Correction Amount } T) \cdot \cos\theta \qquad (7)$$

$$z_{after} = z_{before} + (\text{Longitudinal Position Correction Amount } T) \cdot \sin\theta \qquad (8)$$

Processing of Host Vehicle Position Estimation Device

Figure 8:
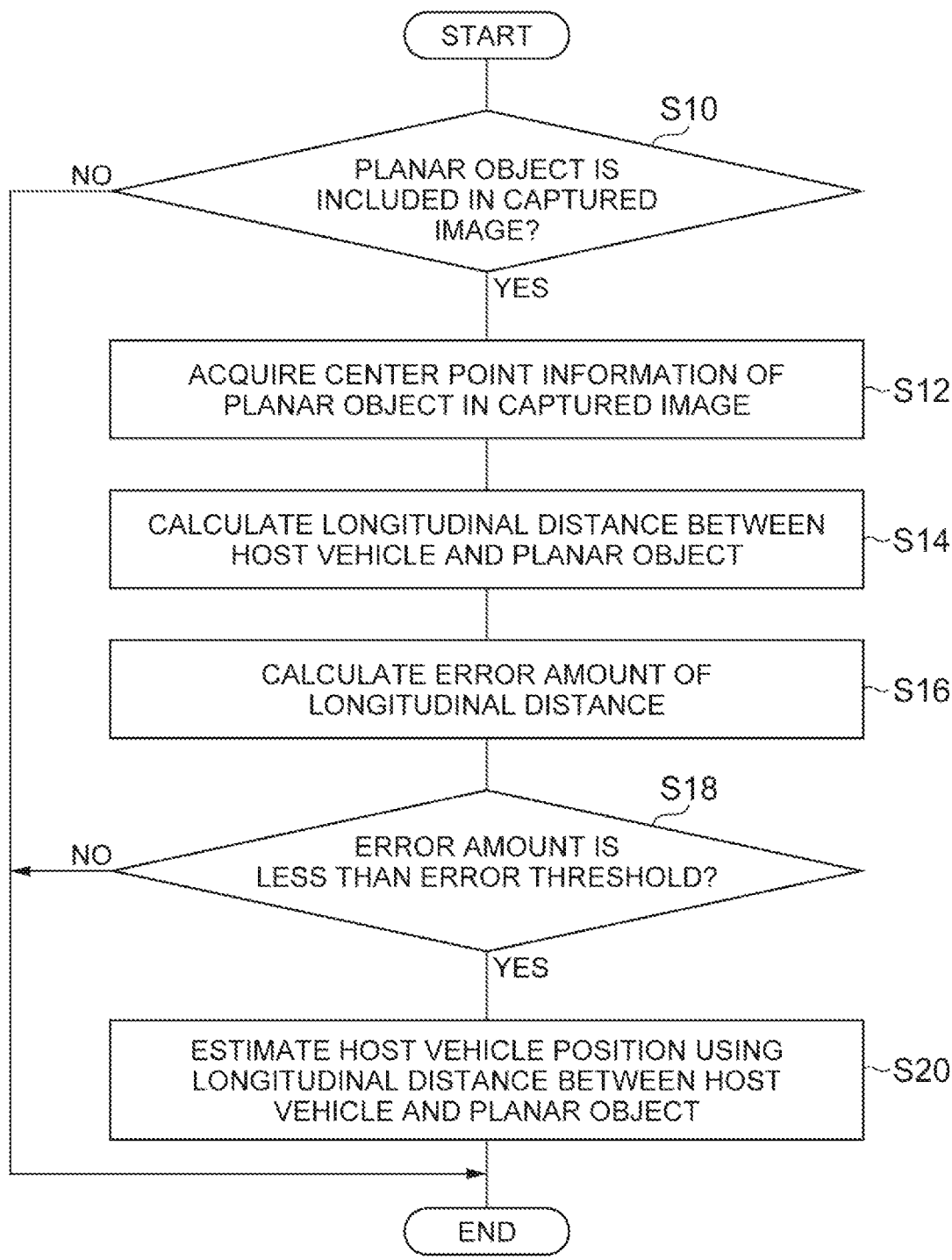
FIG. 8 is a flowchart showing an example of host vehicle position estimation processing.

Next, processing in the host vehicle position estimation device 100 of the embodiment will be described. FIG. 8 is a flowchart showing an example of host vehicle position estimation processing. The processing of the flowchart of FIG. 8 is executed during traveling of the host vehicle M.

As shown in FIG. 8, as S10, the ECU 10 of the host vehicle position estimation device 100 determines with the object determination unit 13 whether or not the planar object is included in the captured image of the camera 2. The object determination unit 13 determines whether or not the planar object is included in the captured image based on the captured image of the camera 2 and the object information of the object database 6. When the object determination unit 13 determines that the planar object is not included in the captured image of the camera 2 (S10: NO), the ECU 10 ends the present processing. Thereafter, the ECU 10 repeats the processing from S10 again after a given time elapses. When the object determination unit 13 determines that the planar object is included in the captured image of the camera 2 (S10: YES), the ECU 10 progresses to S12.

In S12, the ECU 10 acquires the center point information of the planar object with the center point information acquisition unit 14. The center point information acquisition unit 14 acquires the center point information of the planar object including at least one of the longitudinal center coordinate and the lateral center coordinate of the planar object in the captured image based on the captured image of the camera 2 and the object information of the object database 6. Thereafter, the ECU 10 progresses to S14.

In S14, the ECU 10 calculates the longitudinal distance between the host vehicle M and the planar object with the longitudinal distance calculation unit 15. The longitudinal distance calculation unit 15 calculates the longitudinal distance between the host vehicle M and the planar object based on the measurement position of the host vehicle on the map, the positional information of the planar object on the map, the center point information of the planar object in the captured image, the traveling road information, and the focal length of the camera 2. Thereafter, the ECU 10 progresses to S16.

In S16, the ECU 10 estimates the error amount of the longitudinal distance with the error amount estimation unit 16. The error amount estimation unit 16 estimates the error amount of the longitudinal distance based on the traveling road information acquired by the traveling road information acquisition unit 12. Thereafter, the ECU 10 progresses to S18.

In S18, the ECU 10 determines with the host vehicle position estimation unit 17 whether or not the error amount is less than the error threshold. When the host vehicle position estimation unit 17 determines that the error amount is not less than the error threshold (S18: NO), the ECU 10 ends the present processing. Thereafter, the ECU 10 repeats the processing from S10 again after a given time elapses. When the host vehicle position estimation unit 17 determines that the error amount is less than the error threshold (S18: YES), the ECU 10 progresses to S20.

In S20, the ECU 10 performs estimation of the host vehicle position using the longitudinal distance between the host vehicle M and the planar object with the host vehicle position estimation unit 17. The host vehicle position estimation unit 17 estimates the host vehicle position based on the longitudinal distance zc2, the measurement position of the host vehicle M on the map (or the previously estimated host vehicle position), and the position of the planar object on the map.

Figure 9A:
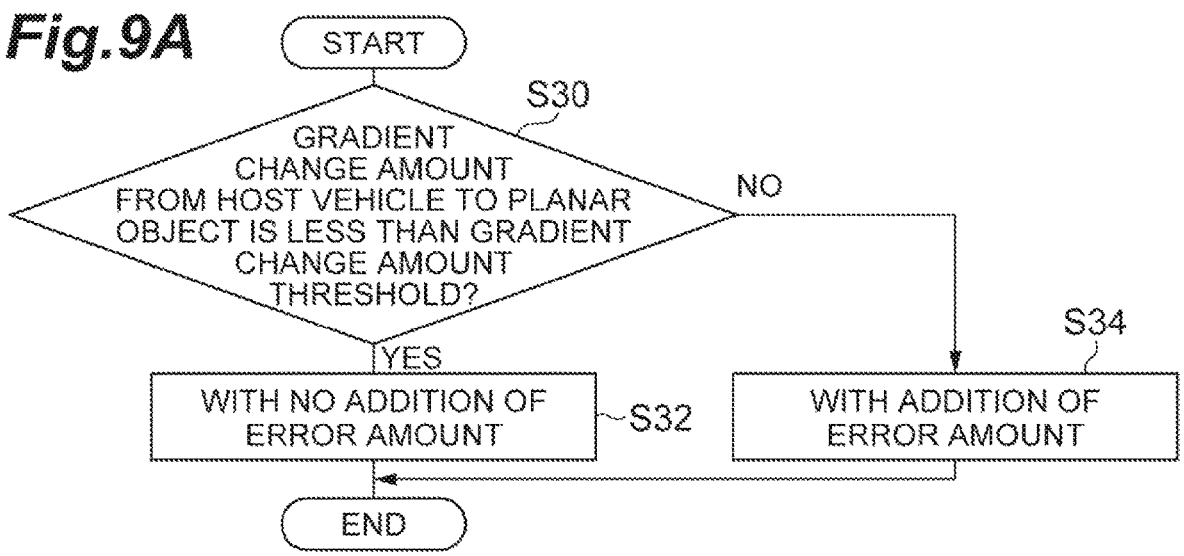
FIG. 9A is a flowchart showing an example of estimation processing of an error amount Ez1 when the longitudinal center coordinate are included in center point information.

FIG. 9A is a flowchart showing an example of estimation processing of the error amount Ez1 when the longitudinal center coordinate is included in the center point information. The processing of the flowchart of FIG. 9A is executed in S16 of FIG. 8 when the longitudinal center coordinate is included in the center point information.

As shown in FIG. 9A, as S30, the ECU 10 determines with the error amount estimation unit 16 whether or not the gradient change amount from the host vehicle M to the planar object is less than the gradient change amount threshold. The gradient change amount can be obtained from the traveling road information of the host vehicle M. When the error amount estimation unit 16 determines that the gradient change amount from the host vehicle M to the planar object is less than the gradient change amount threshold (S30: YES), the ECU 10 progresses to S32. When the error amount estimation unit 16 determines that the gradient change amount from the host vehicle M to the planar object is equal to or greater than the gradient change amount (S30: NO), the ECU 10 progresses to S34.

In S32, the error amount estimation unit 16 estimates the error amount Ez1 with no addition of the error amount due to the gradient change amount. For example, the error amount Ez1 is set as a value set in advance including an error of image recognition, or the like.

In S34, the error amount estimation unit 16 estimates the error amount Ez1 with addition of the error amount due to the gradient change amount. That is, the error amount estimation unit 16 estimates the error amount Ez1 to become a greater value than in S32.

Figure 9B:
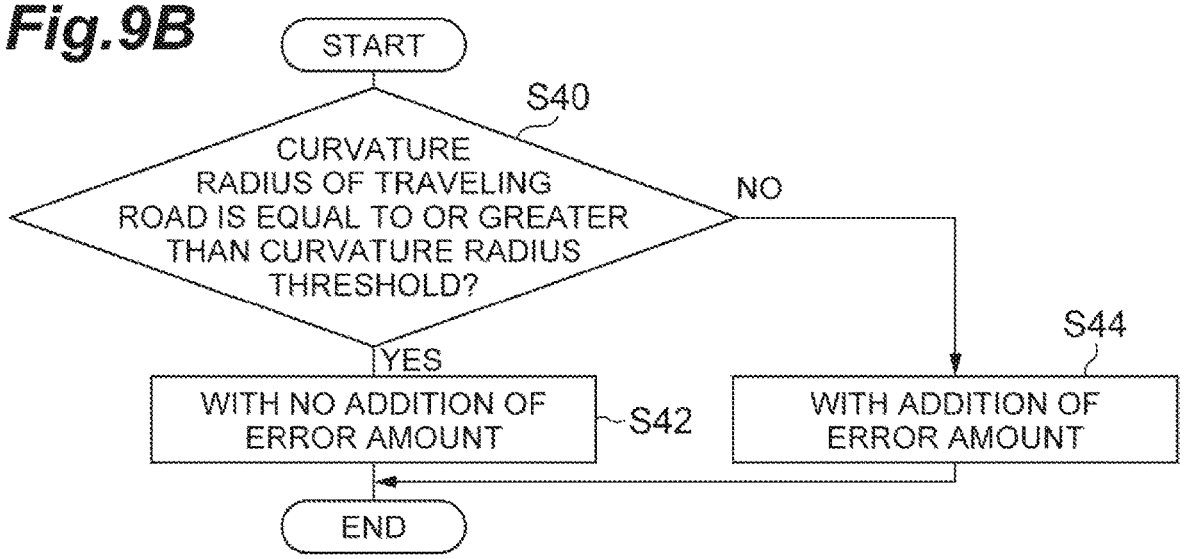
FIG. 9B is a flowchart showing an example of estimation processing of an error amount Ez2 when the lateral center coordinate are included in the center point information.

FIG. 9B is a flowchart showing an example of estimation processing of the error amount Ez2 when the lateral center coordinate is included in the center point information. The processing of the flowchart of FIG. 9B is executed, for example, in S16 of FIG. 8 when the lateral center coordinate is included in the center point information.

As shown in FIG. 9B, as S40, the ECU 10 determines with the error amount estimation unit 16 whether or not the curvature radius of the traveling road is equal to or greater than the curvature radius threshold. When the error amount estimation unit 16 determines that the curvature radius of the traveling road is equal to or greater than the curvature radius threshold (S40: YES), the ECU 10 progresses to S42. When the error amount estimation unit 16 determines that the curvature radius of the traveling road is less than the curvature radius threshold (S40: NO), the ECU 10 progresses to S44.

In S42, the error amount estimation unit 16 estimates the error amount Ez2 with no addition of the error amount Ex due to the curvature radius of the traveling road. For example, the error amount Ez2 is estimated as a value set in advance including an error of image recognition, or the like.

In S44, the error amount estimation unit 16 estimates the error amount Ez2 with addition of the error amount Ex due to the curvature radius of the traveling road. That is, the error amount estimation unit 16 estimates the error amount Ez2 to become a greater value than in S42.

Figure 9C:
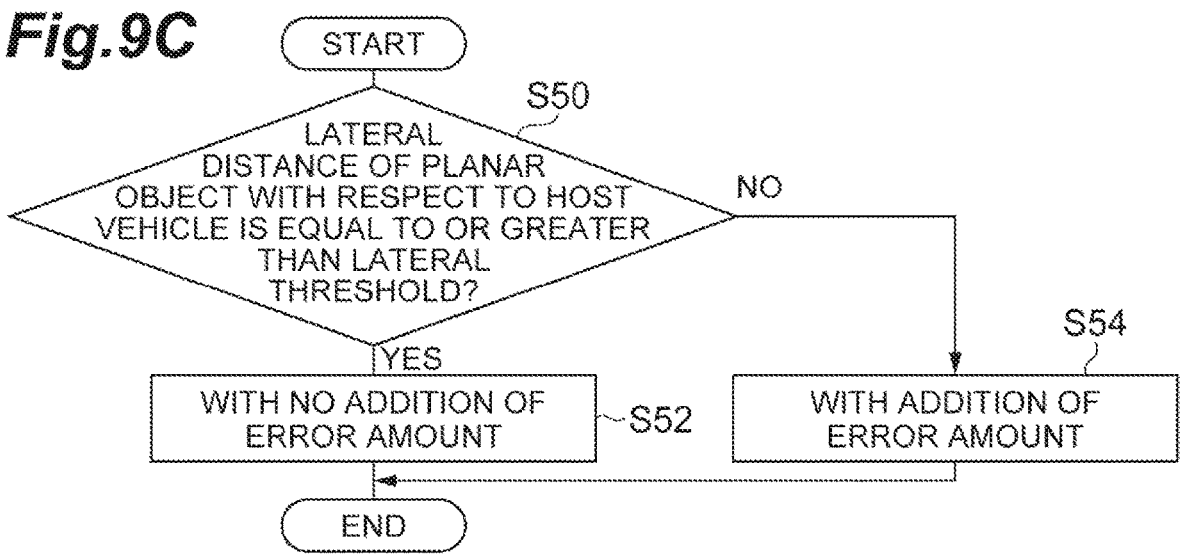
FIG. 9C is a flowchart showing another example of the estimation processing of the error amount Ez2 when the lateral center coordinate are included in the center point information.

FIG. 9C is a flowchart showing another example of estimation processing of the error amount Ez2 when the lateral center coordinate is included in the center point information. The processing of the flowchart of FIG. 9C is executed, for example, in S16 of FIG. 8 when the lateral center coordinate is included in the center point information. The processing of FIG. 9B and the processing of FIG. 9C may be executed in an overlapping manner.

As shown in FIG. 9C, as S50, the ECU 10 determines with the error amount estimation unit 16 whether or not the lateral distance xc2 of the planar object B2 with respect to the host vehicle M is less than the lateral threshold. When the error amount estimation unit 16 determines that the lateral distance xc2 of the planar object B2 with respect to the host vehicle M is less than the lateral threshold (S50: YES), the ECU 10 progresses to 852. When the error amount estimation unit 16 determines that the lateral distance xc2 of the planar object B2 with respect to the host vehicle M is equal to or greater than the lateral threshold (S50: NO), the ECU 10 progresses to S54.

In S52, the error amount estimation unit 16 estimates the error amount Ez2 with no addition of the error amount due to the lateral distance xc2. For example, the error amount Ez2 is estimated as a value set in advance including an error of image recognition, or the like.

In S54, the error amount estimation unit 16 estimates the error amount Ez2 with addition of the error amount due to the lateral distance xc2. That is, the error amount estimation unit 16 estimates the error amount Ez2 to become a greater value than in S52.

In the host vehicle position estimation device 100 according to the embodiment described above, when the planar object, such as a road sign, is included in the captured image, the longitudinal distance between the host vehicle and the planar object is calculated based on the measurement position of the host vehicle M on the map, the positional information of the planar object on the map, the center point information of the planar object in the captured image, and the traveling road information. In the host vehicle position estimation device 100, since the error amount included in the longitudinal distance changes depending on the traveling road of the host vehicle M, when the error amount of the longitudinal distance estimated from the traveling road information is less than the error threshold, the estimation of the host vehicle position is performed using the longitudinal distance.

Accordingly, with the host vehicle position estimation device 100, since the longitudinal distance between the planar object included in the captured image and the host vehicle M is estimated using the positional information of the planar object on the map, it is possible to achieve improvement of the estimation accuracy of the longitudinal distance compared to when the longitudinal distance is estimated solely from the captured image, and to estimate the host vehicle position with high accuracy.

In the host vehicle position estimation device 100, when the lateral center coordinate of the planar object is included in the center point information, the lateral distance xc2 between the host vehicle M and the planar object on the map is obtained from the measurement position of the host vehicle M on the map and the positional information of the planar object on the map, and the longitudinal distance between the host vehicle M and the planar object can be calculated using the lateral distance between the host vehicle M and the planar object on the map and the curvature radius information included in the traveling road information. In the host vehicle position estimation device 100, when the longitudinal center coordinate of the planar object is included in the center point information, the heights of the camera 2 and the planar object are obtained from the height information of the planar object on the map and the longitudinal center coordinate of the planar object in the captured image, the longitudinal distance between the host vehicle M and the planar object can be calculated using the heights of the camera 2 and the planar object and the gradient information included in the traveling road information.

In the host vehicle position estimation device 100, when the longitudinal distance between the host vehicle M and the planar object is calculated from the lateral center coordinate of the planar object in the captured image, since it has been found that the curvature radius of the traveling road, on which the host vehicle M travels, affects the error amount of the longitudinal distance, when the curvature radius of the traveling road is equal to or greater than the curvature radius threshold, the error amount is set as a smaller value than when the curvature radius is less than the curvature radius threshold, whereby it is possible to improve the estimation accuracy of the error amount of the longitudinal distance.

In the host vehicle position estimation device 100, when the longitudinal distance between the host vehicle M and the planar object is calculated from the lateral center coordinate of the planar object in the captured image, since it has been found that the lateral distance of the planar object affects the error amount of the longitudinal distance, when the lateral distance is equal to or greater than the lateral threshold, the error amount is set as a smaller value than when the lateral distance is less than the lateral threshold, whereby it is possible to improve the estimation accuracy of the error amount of the longitudinal distance.

In the host vehicle position estimation device 100, when the longitudinal distance between the host vehicle M and the planar object is calculated from the longitudinal center coordinate of the planar object in the captured image, since the gradient change amount from the host vehicle M to the planar object affects the error amount of the longitudinal distance, when the gradient change amount is less than the gradient change amount threshold, the error amount is set as a smaller value than when the gradient change amount is equal to or greater than the gradient change amount threshold, whereby it is possible to improve the estimation accuracy of the error amount of the longitudinal distance.

Although the preferred embodiment of the present disclosure has been described above, the present disclosure is not limited to the above-described embodiment. The present disclosure may be subjected to various modifications and improvements based on common knowledge of those skilled in the art including the above-described embodiment.

The longitudinal distance calculation unit 15 does not always calculate both of the longitudinal distance $zc1$ obtained from the longitudinal center coordinate of the planar object and the longitudinal distance $zc2$ obtained from the lateral center coordinate of the planar object, and may calculate any one of the longitudinal distance $zc1$ and the longitudinal distance $zc2$. The traveling road information acquisition unit 12 may acquire the curvature radius or the gradient change amount of the traveling road from the camera 2 and the radar sensor 3 in the vehicle, instead of map information.

In addition, "the measurement position of the host vehicle on the map" in the description of other embodiments may be replaced with "the previously estimated host vehicle position" when the estimation of the host vehicle position has been performed even once after the host vehicle starts to travel.

What is claimed is:

1. A host vehicle position estimation device that estimates a host vehicle position as a position of a host vehicle on a map using an object included in a captured image in front of the host vehicle captured with a camera of the host vehicle, the host vehicle position estimation device comprising:
   a measurement position acquisition unit configured to acquire a measurement position of the host vehicle on the map based on a measurement result of a position measurement device mounted in the host vehicle;
   an object database configured to store object information including positional information of the object on the map and appearance information of the object;
   an object determination unit configured to determine whether or not a planar object as a kind of the object is included in the captured image based on the captured image and the object information;
   a traveling road information acquisition unit configured to acquire traveling road information relating to a traveling road, on which the host vehicle travels;
   a center point information acquisition unit configured to, when the object determination unit determines that the planar object is included in the captured image, acquire center point information of the planar object including at least one of longitudinal center coordinate and lateral center coordinate of the planar object in the captured image based on the captured image of the camera and the object information;
   a longitudinal distance calculation unit configured to calculate a longitudinal distance as a distance between the host vehicle and the planar object in a front-rear direction of the host vehicle based on the measurement position of the host vehicle on the map, positional information of the planar object on the map, the center point information of the planar object, and the traveling road information;
   an error amount estimation unit configured to estimate an error amount of the longitudinal distance based on the traveling road information; and
   a host vehicle position estimation unit configured to, when the error amount is less than an error threshold, estimate the host vehicle position using the positional information of the planar object on the map and the longitudinal distance.

2. The host vehicle position estimation device according to claim 1, wherein the longitudinal distance calculation unit is configured to, when the lateral center coordinate of the planar object is included in the center point information, calculate the longitudinal distance between the host vehicle and the planar object based on the measurement position of the host vehicle on the map, the positional information of the planar object on the map, the lateral center coordinate of the planar object in the captured image, and curvature radius information included in the traveling road information.

3. The host vehicle position estimation device according to claim 2, wherein the error amount estimation unit is configured to, when a curvature radius of the traveling road is equal to or greater than a curvature radius threshold, estimate the error amount as a smaller value than when the curvature radius of the traveling road is less than the curvature radius threshold.

4. The host vehicle position estimation device according to claim 2, wherein the error amount estimation unit is configured to, when a lateral distance of the planar object with respect to the host vehicle calculated from the measurement position of the host vehicle on the map and the positional information of the planar object on the map is equal to or greater than a lateral threshold, estimate the error amount as a smaller value than when the lateral distance is less than the lateral threshold.

5. The host vehicle position estimation device according to claim 1, wherein the longitudinal distance calculation unit is configured to, when the longitudinal center coordinate of the planar object is included in the center point information, calculate the longitudinal distance between the host vehicle and the planar object based on height information of the planar object on the map included in the positional information of the planar object on the map, the longitudinal center coordinate of the planar object in the captured image, and gradient information included in the traveling road information.

6. The host vehicle position estimation device according to claim 3, wherein the error amount estimation unit is configured to, when a lateral distance of the planar object with respect to the host vehicle calculated from the measurement position of the host vehicle on the map and the positional information of the planar object on the map is equal to or greater than a lateral threshold, estimate the error amount as a smaller value than when the lateral distance is less than the lateral threshold.

* * * * *